(12) United States Patent
Warner et al.

(10) Patent No.: US 9,603,402 B2
(45) Date of Patent: Mar. 28, 2017

(54) NOVELTY APPAREL WITH MULTIPLE ATTACHED CONFORMABLE SELECTABLE INDICIA

(71) Applicants: Shelley S. Warner, Boca Raton, FL (US); Roy Warner, Boca Raton, FL (US)

(72) Inventors: Shelley S. Warner, Boca Raton, FL (US); Roy Warner, Boca Raton, FL (US)

(73) Assignee: Clients Quarterly, LLC, Boca Raton, FL (US)

( * ) Notice: Subject to any disclaimer, the term of this patent is extended or adjusted under 35 U.S.C. 154(b) by 826 days.

(21) Appl. No.: 13/958,327

(22) Filed: Aug. 2, 2013

(65) Prior Publication Data

US 2015/0033445 A1     Feb. 5, 2015

(51) Int. Cl.
| | |
|---|---|
| *A42B 1/00* | (2006.01) |
| *A42B 1/04* | (2006.01) |
| *A63F 9/24* | (2006.01) |
| *A63F 13/00* | (2014.01) |
| *A42B 1/24* | (2006.01) |

(52) U.S. Cl.
CPC ............. *A42B 1/248* (2013.01); *A63F 13/00* (2013.01)

(58) Field of Classification Search
CPC .......... A42B 1/205; A42B 1/206; A42B 1/24; A42B 1/248
USPC ............... 2/171, 195.1, 195.2, 209.12, 209.1
See application file for complete search history.

(56) References Cited

U.S. PATENT DOCUMENTS

| | | | |
|---|---|---|---|
| 2,699,553 A | 1/1955 | Byers et al. | |
| 2,796,680 A | 6/1957 | Wittcoff | |
| 2,803,829 A | 8/1957 | Tscharner | |
| 2,871,485 A | 2/1959 | Greco | |
| 3,484,974 A | 12/1969 | Culmone | |
| 3,513,481 A * | 5/1970 | Nickerson | A42B 3/145 2/418 |
| 4,416,633 A * | 11/1983 | Gulack | A42B 1/24 283/117 |

(Continued)

FOREIGN PATENT DOCUMENTS

CA     2152875 A1     10/1996

OTHER PUBLICATIONS

"Live Action Role-Playing Game" From Wikipedia. [dated May 23, 2013], [online], [retrieved Oct. 24, 2016]. <URL:https://web.archive.org/web/20130523212541/http://en.wikipedia.org/wiki/Live_action_role-playing_game>. 15 Pages.*

*Primary Examiner* — Milap Shah
(74) *Attorney, Agent, or Firm* — Alfred M. Walker; Mark Bender

(57) ABSTRACT

A novelty apparel includes multiple attached conformable, selectable and viewable occupational role playing indicia. A baseball cap includes a dome shaped crown of compound curves and a forward facing sun visor brim portion, a transparent window in a central front face portion of the dome shaped crown, where the window displays a single indicium selectable from a number of different indicia carried on a display surface conformable to said dome shaped crown. The selected indicium is displayed centered above the brim. The display surface conforms to the curved interior of the dome shaped crown, wherein the baseball cap does not deviate substantially from the look of a typical baseball cap with a single permanent indicium.

9 Claims, 7 Drawing Sheets

(56) References Cited

U.S. PATENT DOCUMENTS

| | | |
|---|---|---|
| 4,611,355 A | 9/1986 | Galanto et al. |
| 4,710,981 A | 12/1987 | Sanchez |
| 4,776,043 A | 10/1988 | Coleman |
| 4,901,211 A | 2/1990 | Shen |
| 4,918,758 A | 4/1990 | Rendina |
| 4,927,147 A | 5/1990 | Delzio |
| 4,999,848 A | 3/1991 | Oney |
| 5,253,368 A | 10/1993 | Blake |
| 5,359,733 A | 11/1994 | Brannon et al. |
| D359,383 S | 6/1995 | Hutchinson et al. |
| 5,452,479 A | 9/1995 | Mostert |
| 5,465,426 A | 11/1995 | Beaton |
| 5,477,629 A | 12/1995 | Gleason, Jr. |
| 5,509,144 A | 4/1996 | Soergel et al. |
| 5,581,813 A | 12/1996 | Henschel |
| 5,652,959 A * | 8/1997 | Proctor .................. A42B 1/004 132/319 |
| 5,708,984 A | 1/1998 | Shofner |
| 5,718,589 A | 2/1998 | McCracken et al. |
| 5,915,539 A | 6/1999 | Lack |
| 6,004,232 A | 12/1999 | Sennott |
| 6,175,963 B1 | 1/2001 | Loeffelholz |
| 6,243,877 B1 | 6/2001 | Heyward, Jr. |
| 6,311,332 B1 | 11/2001 | Lien |
| 6,422,558 B1 | 7/2002 | Chambers |
| 6,471,059 B2 | 10/2002 | Purvis |
| 6,519,779 B1 | 2/2003 | Taguchi |
| 6,643,847 B1 | 11/2003 | Dornak |
| 6,782,554 B1 | 8/2004 | Froehlich |
| 6,978,999 B2 | 12/2005 | Kline et al. |
| 7,240,373 B2 | 7/2007 | Ahn et al. |
| 7,243,377 B2 | 7/2007 | Ashy |
| 7,310,830 B2 | 12/2007 | Kuharcik et al. |
| 7,461,764 B2 | 12/2008 | Thompson |
| D647,286 S | 10/2011 | Malek |
| 8,510,867 B2 | 8/2013 | Errigo |
| 8,702,102 B1 | 4/2014 | Rohrmeister |
| 2002/0020082 A1 | 2/2002 | James |
| 2005/0187817 A1 | 8/2005 | Hall et al. |
| 2006/0038349 A1 * | 2/2006 | Meeks ................ A63F 1/04 273/308 |
| 2007/0028361 A1 * | 2/2007 | Ashy ................ A42B 1/248 2/209.13 |
| 2008/0061502 A1 * | 3/2008 | Cunliffe ................ A63F 9/00 273/148 R |
| 2008/0096665 A1 * | 4/2008 | Cohen ................ A63F 13/12 463/42 |
| 2010/0019451 A1 | 1/2010 | Kucharski |
| 2010/0313334 A1 * | 12/2010 | Moy ................ A42B 1/248 2/209.13 |
| 2011/0041238 A1 * | 2/2011 | Brzoska ................ A42B 1/205 2/209.13 |
| 2011/0067168 A1 | 3/2011 | Steiner |
| 2012/0005809 A1 | 1/2012 | Johnson |
| 2014/0038723 A1 * | 2/2014 | Samdahl ................ A63F 13/12 463/42 |

* cited by examiner

Fig. 8
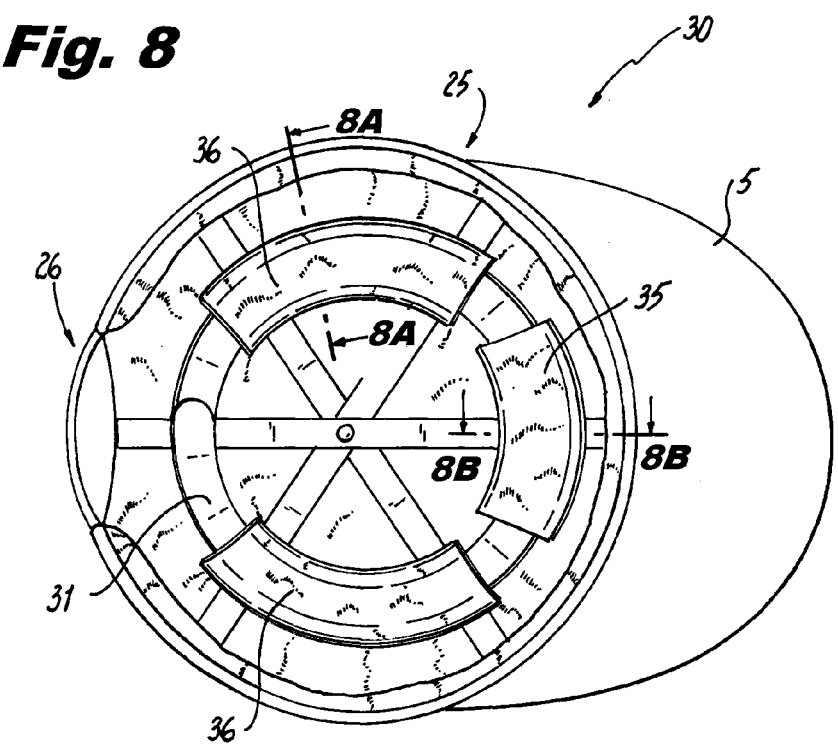
Fig. 8A
Fig. 8B
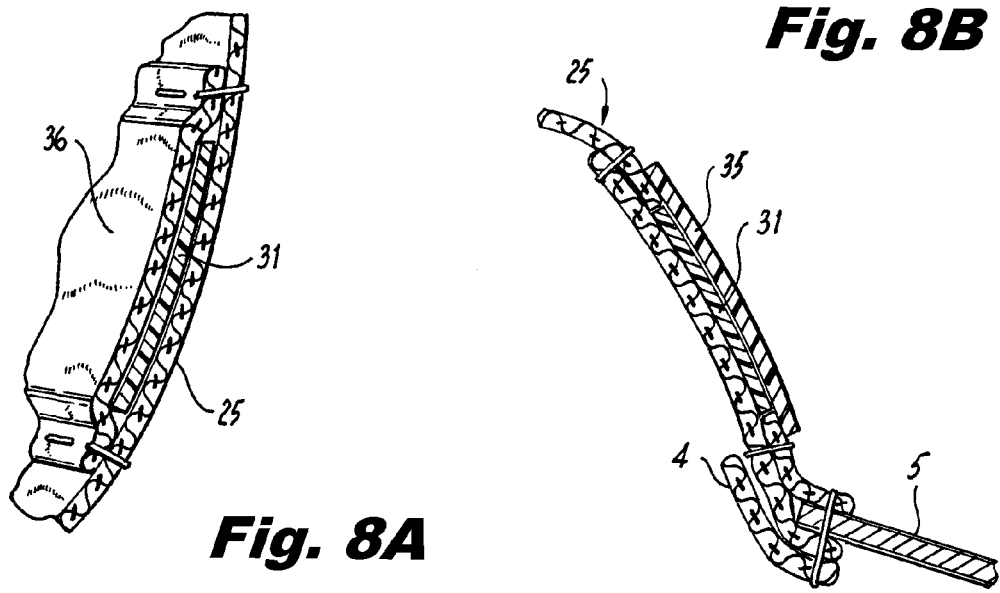

NOVELTY APPAREL WITH MULTIPLE ATTACHED CONFORMABLE SELECTABLE INDICIA

FIELD OF THE INVENTION

The present invention relates to a novelty game with apparel, such as a baseball cap with multiple attached conformable, selectable and viewable indicia.

BACKGROUND OF THE INVENTION

Baseball caps, besides being part of a baseball team's uniform, have become a mainstay of casual wear. The general shape is that of a dome nominally sized to fit the head of the wearer with a long frontal brim with an opening and size adjustment strap on the back. Hats come emblazoned with a wide variety of indicia usually on the dome portion at the front atop the brim.

The prior art includes educational games where phrases are interchangeable to teach grammar, such as disclosed in U.S. Pat. No. 4,613,309 of McCloskey for interchangeable figures of speech, or as in U.S. Pat. No. 3,235,976 of Elliot for phrase building blocks. However, neither Elliot nor McCloskey describe a novelty game including apparel, such as shirts or caps, with interchangeable role playing indicia.

The prior art does not teach a baseball cap with multiple attached selectable indicia in a shape conformable to the cap itself, since the crown of the cap is dome shaped with many compound curves converging toward an apex of the cap.

Among related patents include U.S. Pat. No. 2,796,270 of Wittcoff. Wittcoff '270 describes a fedora-type hat with an internal rotating sheet, having a series of child's math problems on the sheet. which are viewable though a transparent viewing window. When the sheet is rotated, a different math problem appears. When the child looks inside the hat, the answer to the math problem appears in a corresponding interior transparent viewing window. Wittcoff '270 describes a vertically extending multi-image band that rotates within a hat crown portion that is a simple cylinder with an oval crossection. However, Wittcoff does not describe a rotatable band that is a compound curved dome, which utilizes changing tangential radii, which greatly enhances the conformability of the band within a domed crown of a baseball cap, which has an infinite number of changing radii, and which converge to an apex at the top of the domed crown.

U.S. Pat. No. 2,699,553 of Byers, et al. describes a novelty hat that has a single exterior strip band, to which are attached letters forming a word, but not interchangeable images.

U.S. Pat. No. 2,803,829 of Tscharner discloses a cap with a plurality of transparent pockets, into which pockets pictures are inserted.

U.S. Pat. No. 6,243,877 of Heyward patent describes a hat with multiple brims and multiple permanently attached logos or insignias.

U.S. Pat. No. 4,776,043 of Coleman and U.S. Pat. No. 6,519,719 of Taguchi both describe apparel, such as baseball caps, with a front VELCRO® hook and loop panel for interchangeable attachment of different athletic team logos/ names, each having corresponding VELCRO® hook and loop fasteners.

U.S. Pat. No. 7,240,373 of Ahn is a hat that has a single logo but a rotatable inside ring, primarily provided for moving the beak of the cap around or for removing the crown to convert a hat into a sun visor, without a domed crown portion.

U.S. Pat. No. 7,243,377 of Ashy patent describes a hat with interchangeable images, but which are magnetically or otherwise attached one by one to the hat.

U.S. Pat. No. 6,311,322 of Lien describes a hat with an arcuate front pouch, into which is inserted one or many different trade name logos. But Lien '332 does not have an interior rotating sheet of logos.

The Tscharner '829, Heyward '877, Coleman '043, Taguchi '779 and Ashy '377 patents, teach hats with separate attachments of indicia by corresponding VELCRO® or magnetic fasteners. However, these references actually do not teach the use of a band with a plurality of indicia, rotatable within a domed cap crown with an infinite number of converging tangential radii forming a compound curved dome, that would overcome the problems associated with the vertically extending indicia band of the prior art of Wittcoff '270 with a band with vertically extending wall that is not a compound curve, which hinders the effectiveness of the indicia band of Wittcoff '270 to rotate within a domed crown of a baseball cap.

Moreover, the separately attached logos of Tscharner '829, Heyward '877, Coleman '043, Taguchi '779 and Ashy '877 have the detrimental effects of needing to be separately attached removed individually.

To that end, the aforementioned prior art hats with multiple indicia are either directed to a band with a vertically extending wall with multiple images which does not rotate within a dome, or where each image must be separately removed or attached.

OBJECTS OF THE INVENTION

It is an object of the present invention to provide a novelty information game with interchangeable occupational role playing status identifiers associated with the apparel or other support surface for removably attachable occupational role playing identifiers, preferably associated with a related occupational role playing identifier phrase having related subsets of phrases.

It is also an object of the present invention to provide a baseball cap with multiple attached conformable, selectable and viewable indicia.

It is also an object of the present invention to provide a band or inner shell of multiple indicia which has compound curves conforming to the compound curves of the domed crown of a baseball cap.

Other objects which become apparent from the following description of the present invention.

SUMMARY OF THE INVENTION

In keeping with these objects and others which may become apparent, the present invention is a novelty game with an article of apparel, such as a shirt or a baseball cap which has provision to display a single indicium selectable from a number of different secondary indicia carried on the cap itself.

For example, the indicia can be words suggesting the multitasking occupational role playing of the wearer of the baseball cap, such as "Grandma", "Babysitter", "Librarian" or simply "Off Duty". The selected indicium is displayed centered above the brim, and due to the conformability of the display system used, does not deviate substantially from the look of a typical baseball cap with a single permanent indicium.

Alternatively, the single indicium associated with that article of apparel can be a permanently attached primary indicium, associated with a subset of role playing phrases associated with the primary indicium.

The article of apparel may be a domed shaped baseball cap of the present invention, which includes a domed crown portion with an infinite number of converging tangential radii forming a compound curved dome, converging at a top apex of the domed crown. Therefore, the prior art of Wittcoffs '270 oval crossectional cylinder with a continuous straight upwardly extending band wall would not work in the present invention, where the domed crown decreases in diameter as it goes upward toward the pinnacle apex point of the crown of the cap.

The selected indicium, to be displayed in a viewable window portion of the baseball cap of the present invention, is one indicium of a plurality of indicia provided along a rotating band, which rotates within the compound curve of the dome cap. The rotating band of the present invention is substantially different than the band inside of the lower portion of Wittcoffs '270's band, which is substantially an oval shaped cylinder with straight upstanding sides. In contrast, the rotating indicia band of the present invention follows the compound curve of a domed baseball type cap, with tangential radii which taper infinitely toward the apex of the domed crown of the baseball cap of the present invention.

In one embodiment, an inner domed shape liner shell of the present invention is rotatable about a rotatable fastener located at the apex button on top of the baseball cap.

In another embodiment, the inner liner is a band conforming to a truncated portion of the crown dome. The inner liner band accommodates the compound curve of the domed crown of the baseball cap of the present invention.

In the first embodiment of this invention, an inner liner formed in the shape of a hollow half-dome carries a plurality of indicia, such as, for example, three or more different indicia on its outer surface. The baseball cap itself has a glazed or unglazed window centered above the brim. Preferably, the window is rectangular, but may assume other geometric shapes. The liner is tucked into the sweat band of the cap and rotated such that the desired indicium is in registration with the cap window and therefore visible from the front. While the liner can be stiffened fabric or flexible cardboard, the liner is preferably thermoformed from a thin sheet of plastic, such as, for example, semi-rigid polyvinyl chloride (PVC) or similar thermoplastic.

In a related second embodiment, an inner dome is also used, but in this case a full dome carrying six or more different indicia on its exterior is used. The inner dome is attached to a rotatable fastener through a small hole (replacing the typical top button) in a modified cap. Thereby it is able to be rotated within the cap, to place the desired indicium in registration with the front window. To avoid interfering with the cap's size adjustment, provide ventilation, and permit the inner dome the ability to conform closely and flexibly to the wearer's head size, optional radial slots preferably of approximately ¼ inch wide and emanating from a circular region near the center are used. A fastener, such as a small hook and loop strap, or other fastener, locks the desired indicium in place by attaching the dome from the underside of the brim to the lower edge of the dome, thereby keeping it from rotating.

In a third embodiment of the present invention, indicia is emblazoned on the outer surface of a circular split band of thermoplastic of slightly larger diameter than required to fit within the cap, in a horizontal altitude at a certain height, in height registration with the viewable window on the front center of the cap. Since the crown portion of the baseball cap is dome shaped, a flat vertically extending band would not conform internally. The crossection of the band is therefore shaped to conform closely to the dome shape of the cap. Thus a compound curve, circular and with spherical crossectional fit, is used in this split band. The ends of the band overlap when the diameter is reduced to fit the intended position inside the cap, and the springiness of the band material forces it into intimate contact with the cap interior. The sides of the band are supported in loose-fitting fabric sleeves while the front is supported by a slot in a rigid plastic frame attached around the front indicia opening. The diameter of the band changes slightly with adjustments of the size-adjusting strap in the rear, due to its split nature, whereby the ends are permitted to slide over each other. The indicium of choice is selected by rotating the split band inside the cap.

In a fourth embodiment of this invention, a curved indicia holder is external to the baseball cap in the form of a transparent generally rectangular shallow sealed box with an open slot on its lower edge. The only modification to the baseball cap is the addition of a tight horizontal strap at the front of the cap near the intersection of the dome shaped portion and the brim. The holder has a strap-engaging clip on the rear which removably attaches it to the cap. In this manner, if the indicia is not to be displayed for an occasion, the holder is simply removed from the cap leaving only the strap which is not obtrusive. While indicia on separate cards can be stored by sliding into the holder slot with the top indicium displayed, in this embodiment, three or four cards attached at perforations are used for indicia on both sides of each card. If thinner card material is used, even more can be combined into a pack. The pack is just folded to display the indicium of choice through the front of the holder. To make the holder conformable to the cap, it is slightly curved in shape so as to have a front surface in the shape of the surface of a cone of appropriate dimensions, with an upper edge diameter slightly smaller than that of the bottom edge, which matches the diameter and slight dip at the intersection of brim and cap. It is important to avoid the use of a compound curve here (as, for example the surface of a sphere) to facilitate easier insertion and removal of the card pack and less wear when folding and unfolding the pack. This shape is actually derived from taking a rectangular sheet the size of the front of the holder and then matching the bottom to the brim and the top edge to the dome of the cap for a "best fit" to the spherical contour.

In a fifth embodiment, the transparent window and curved indicia holder may be substituted by an article of apparel bearing at least a support attachment for a single indicium, such as a VELCRO® patch, which has a corresponding VELCRO® attachment, such as in Coleman '043 or Taguchi '729, but where the single indicium is associated with a subset of secondary occupational role playing indicia.

The use of the indicia band in the present invention for baseball caps, where the crown portion is a dome, forming a compound curve, would be discouraged, if not clearly taught away from aforementioned prior art hats.

Therefore, the use of a multiple indicia bearing unitary band, or inner shell, forming a compound curved dome, or a portion thereof, conforming to the compound curve of a domed crown of a baseball cap, as in Applicant's present invention, or with a foldable strip of indicia with a transparent pocket conformable with a front portion of a domed crown of a baseball cap, are not only not suggested, but would be discouraged or taught away by the prior art hats.

It is further noted that the primary purpose of Applicant's hat (or even on another article of clothing) is not just the utility of the apparel. The purpose is a gift/novelty occupational role playing game/method.

The distinguishing feature from the Coleman '843 hat patent is that the hat is designed to be a "team booster" hat, i.e. a way to support one's team as a sports fan—the main identifier slogan is the wearer's team, with the interchangeable VELCRO® attached logos of teams that the fan's team is playing.

In contrast, the present invention is a gift/novelty item.

The crucial element to distinguish Applicant's role playing status identifiers is that one of them has to say "OFF DUTY", which is interchangeable with other occupational role playing status identifiers generally—chef, driver, tutor, etc.—the "OFF DUTY" component when combined with the status identifiers makes the game system unique, i.e., as a gift/novelty, not just as a product of apparel having actual utility for multitasks. The present invention for fanciful placement of role playing isn't just words—it's wording for a gift/novelty item that can be changed on the same article of clothing.

The occupational role playing status identifiers interchangeably displayed on the apparel, such as a hat, can be customized by the purchaser. For example, a person's name could be used.

The following are some "in-stock" standard primary occupational role playing status identifiers used:

CHIEF COOK & BOTTLE WASHER
MOM
NEW MOM
DAD
NEW DAD
GRANDMA
GRANDPA
BRIDE
GROOM
MAID OF HONOR
BEST MAN
BRIDESMAID
USHER
NEW BRIDE
NEW GROOM
NEWLYWED
SITTER
BABYSITTER
AUNT
UNCLE
COUSIN
BROTHER
SISTER
SON
DAUGHTER
GRANDSON
GRANDDAUGHTER

The following are some other options for primary occupational role playing status identifiers used:

COACH
FRIEND
TEACHER
PILOT
FIRE FIGHTER
LAWYER
DOCTOR
DENTIST
BOSS
ACCOUNTANT
OWNER
BOSS
PRODUCER
DIRECTOR
ACTOR
PROFESSOR
LIBRARIAN
LAB TECH
COMPUTER TECH
CAB DRIVER
CHEF
CHAUFFEUR
WAITER
WAITRESS
STUDENT
MANAGER
FLIGHT ATTENDANT
ENGINEER
ASTRONAUT
EVENT PLANNER
SECRETARY
TAILOR
HAIRDRESSER
MANICURIST
SEAMSTRESS
PERSONAL AIDE
PERSONAL ASSISTANT
PLUMBER
ELECTRICIAN

The aforementioned primary occupational role playing status identifiers are nouns. They can be changed to verbs. For example, instead of "gardener," it could be "gardening." A standard "in-stock" model could be "MOM" as the main identifier, with "Off Duty," "Tutor," "Chef" and "Chauffeur," as the interchangeable status identifiers. However, the article could be customized by the purchaser. The manufacturer of the apparel of the present invention has discretion not to produce items that are obscene or contain profanity.

The following are secondary occupational role playing status identifiers, a subset of which are associated with a single primary role playing status identifier, such as MOM, GRANDMA, GRANDPA, AUNT, COACH, LIBRARIAN, etc.

Off Duty
Headache
Not Tonight
Boss
Manager
Cook
Sous Chef
Chef
Driver
Chauffeur
Housekeeper
Shopper
Tutor
Teacher
Cleaner
Gardener
Bookkeeper
Accountant
Laundry
Diaper Duty Bottle Duty
Bartender
Painter
Story Teller
Masseuse
Trainer
Exerciser
Coach
Trainer
Organizer
Planner
Groomer
Dog Walker
Vet
Tailor
Seamstress
Artist
Nurse
Aide
Carpenter
Barbecue Boss
Mover
Decorator
Hostess
Host
Typist
Mechanic
Plumber Besides hats, the occupational role playing novelty game can be used with shirts and other apparel. For example, the primary role playing status identifier such as a T shirt saying "Mom" and then below "Off Duty," selected from a subset of secondary occupational role playing status identifiers provided with the article of apparel, such as the hat.

The novelty informational game uses a novelty apparel assembly collection interchangeable garment portions associated with lists of occupational (including "retired" people) role playing status identifiers which are interchangeably attachable to the interchangeable garment portions, such as baseball caps or shirts.

The present invention provides novelty apparel with interchangeable groups of related phrases that are interchangeable on garments to selectably indicate the wearer of the apparel's occupational role playing status, which is interchangeable with other role playing status' selected from a collection of secondary occupational related role playing status identifiers. As a novelty item, the wearers can elicit entertaining responses from other participants who optionally can have their own selected articles of apparel.

For example, the novelty apparel may be an improvisation, novelty role-playing, entertainment system or game for entertaining one's self and others, preferably requiring imagination and/or competitive imaginative improvisation, among a group of competitors playing a game, and/or engaging in competitive, imaginative extemporaneous occupational status role-play improvisation, among at least two individuals, which may be at least one adult and at least one child, at least two adults or at least two children.

The improvisational novelty role playing entertainment system and/or game preferably includes the steps of
1. proposing rules and procedures for an entertainment session comprising occupational status related role playing;
2. discussing said rules and procedures for said session;
3. agreeing upon said rules and procedures;
4. proposing a competitive scheme for use of said rules and procedures.
5. agreeing upon said competitive scheme;
6. donning an article of apparel by at least one session participant which identifies said at least one session participant as virtually and imaginatively occupying a preselected role playing, occupational status related role; and,
7. engaging in the occupational status related role playing with the at least one other participant by displaying occupational role playing roles to the at least one other participant and eliciting oral or written feedback therefrom.

Preferably, the article of apparel includes a covering having an inside and an outside surface for covering at least a part of participant's body, one portion of the article of apparel having a user-selectable, user controllable display means mounted thereon and the outside for display to at least one other participant, so that the participant displays occupational role playing to the at least one other participant through the user-controllable graphic display.

It is noted that the article of manufacture can be a hat, a shirt or other body worn article of apparel. Optionally, the display means comprises an article of manufacture controllable by the user; For example, the display means of the article of apparel may include an outside surface covering having at least one cut-out section for displaying the graphic indicia on a user-rotatable inner band, where the graphics are displayed to at least one second participant through said at least one cut out section in said article of apparel outside surface.

The display means can optionally be a hook-and-loop removable patch system wherein a plurality of patches bearing graphic indicia may be applied and alternately removed as desired by a participant wearing said article of apparel.

Further optionally, the display means may be an electronic display means, wherein the electronic display means includes at least one low voltage power source, such as a battery or a solar cell, and at least one electronic light source, such as a light emitting diode (LED) or liquid crystal display (LCD) pixel display screen, an optional sound producing device, such as a sound emitting semi-conductor chip. In a preferred embodiment there is also provided a user-controllable user replaceable solid state electronic storage means (such as a computer jump drive) containing computer downloaded pre-recorded user selectable individual words, phrases, graphic images, audio files and video files, or combinations thereof, for user-controllable displaying on the at least one LED or LCD pixel screen to at least one other participant.

The electronic display can be permanently mounted to the article of apparel, or can be mounted on a user rotatable band within the article of apparel, or can be a hook-and-loop fastener pad so as to make it user applyable and alternately user-removable, respectively to and from the article of apparel having the rotatable band or at least one hook-and-loop mating pad disposed thereupon.

The article of apparel's outside surface covering may have at least one cut-out section for displaying said graphic indicia on the user-rotatable inner band, where the graphics are displayed to at least one second participant through the at least one cut out section in the article of apparel outside surface, such as the outside surface of a hap, baseball cap, short, sweatshirt, jacket, coat, pants, dress, undergarment or article of footwear, such as socks, stockings, sneakers, shoes, slippers or boots.

BRIEF DESCRIPTION OF THE DRAWINGS

The present invention can best be understood in connection with the accompanying drawings. It is noted that the invention is not limited to the precise embodiments shown in drawings, in which:

FIG. 8 is a plan view of the bottom inside of the cap of the third embodiment showing the split indicia band in place;

FIG. 8A is a crossectional detail showing the indicia band within a loose-fitting fabric sleeve on the inside of a baseball cap;

FIG. 8B is a crossectional detail of the indicia band as inserted into the guidance slot of the front indicium display window;

DETAILED DESCRIPTION OF THIS INVENTION

The following non-limiting examples are illustrative of the various embodiments of the present invention. While the drawings show baseball caps with interchangeable indicium on interior bands, it is known that other supports for the indicium can be employed and that other articles of apparel can be used.

Figure 1:
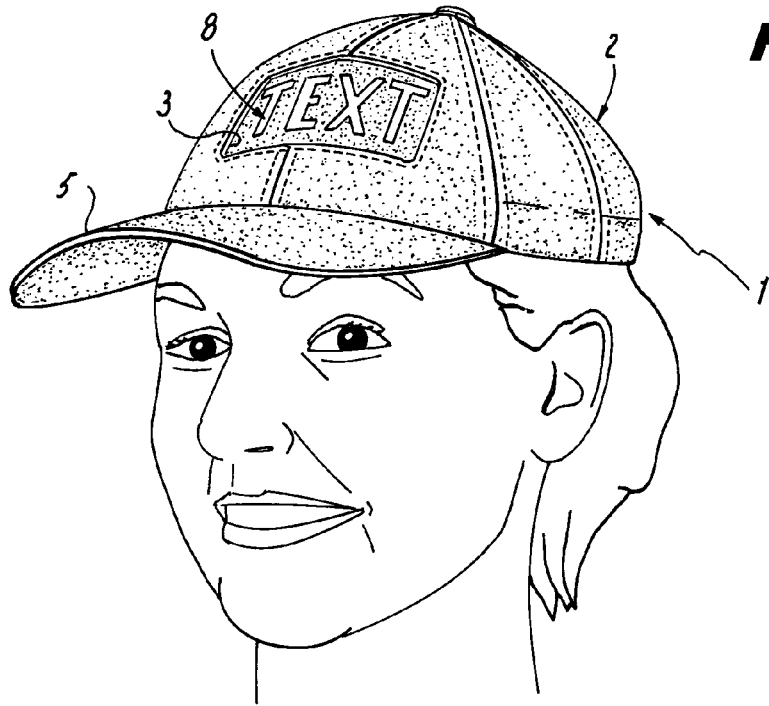
FIG. 1 is a perspective view of a first embodiment of an article of apparel, such as a cap depicted, of this invention for occupational role playing roles with novelty apparel, wherein the cap is depicted in use showing an indicium being displayed.
Figure 2:
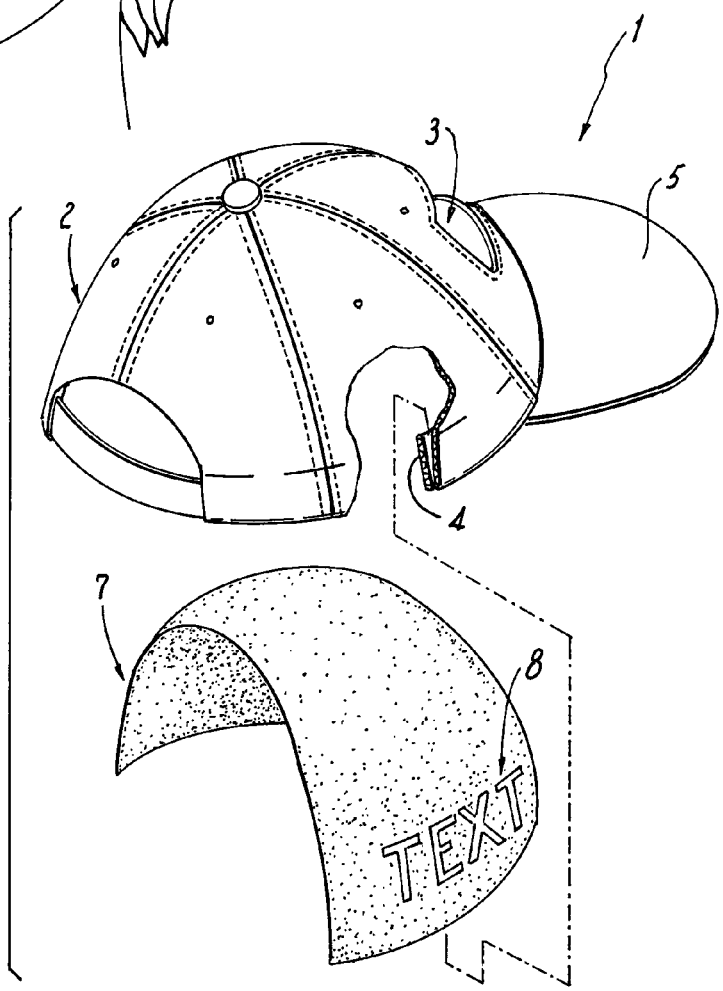
FIG. 2 is a perspective view of the baseball cap of the first embodiment and the ½ inner dome with indicia of the first embodiment.

FIGS. 1 and 2 relate to the first embodiment 1 of the baseball cap of this invention showing indicia viewing window 3 through cap dome 2 with indicium 8 (i.e. "TEXT") showing above brim 5. Window 3 can be open or glazed with a transparent covering. Inner dome 7 is a partial dome, such as a half dome, which fits within cap dome 2 and is secured within sweat band 4; it is rotated to place the desired indicium in registration with window 3.

Figure 3:
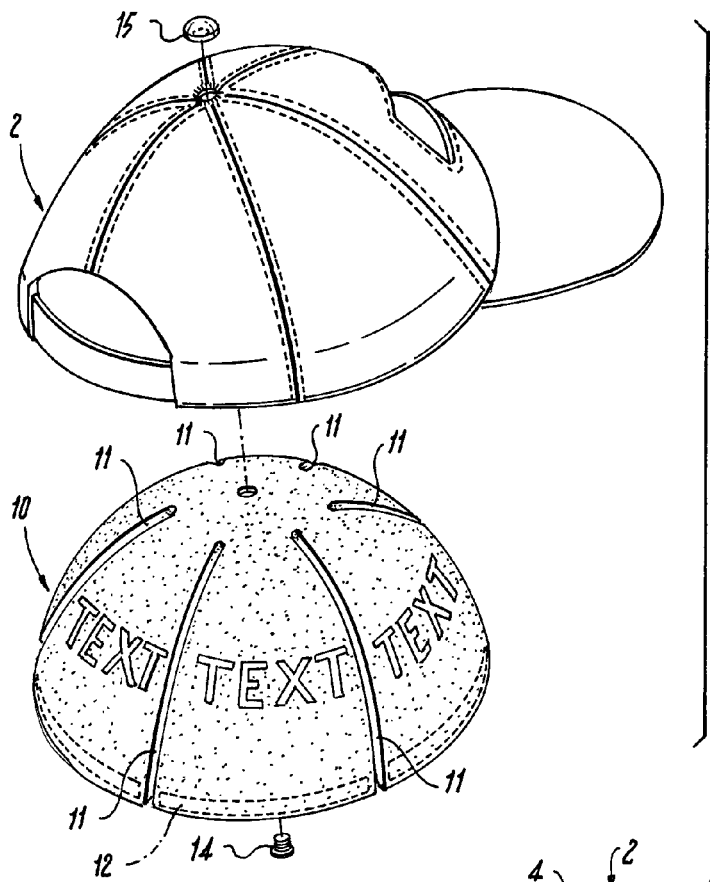
FIG. 3 is a perspective view of the full inner dome of the second embodiment.
Figure 4:
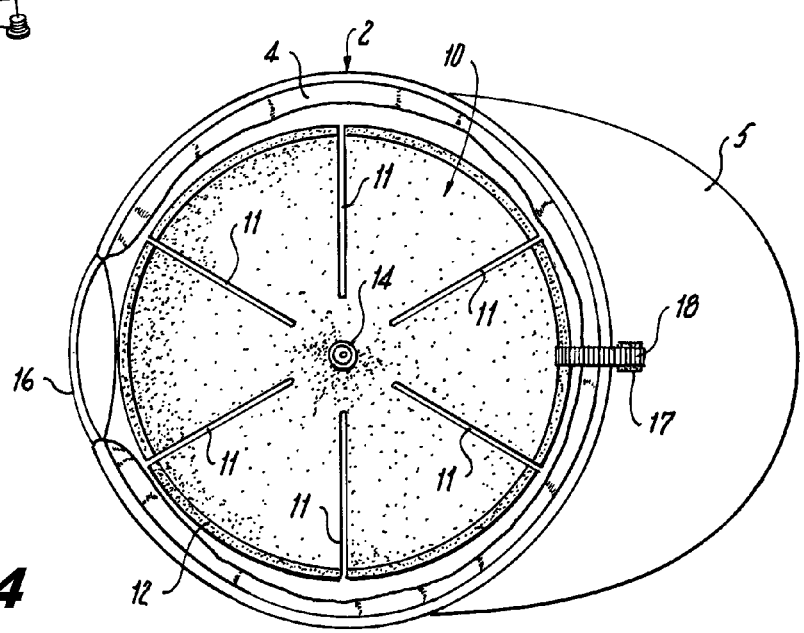
FIG. 4 is a plan view of the bottom and inside of a cap of the second embodiment showing the locking strap used to prevent the inner dome from rotating.

FIGS. 3 and 4 relate to the second embodiment wherein a full dome 10 with slots 11 are used. A fastener, such as, for example, screw 14 with cap nut 15 through a central hole in dome portion of cap 2, attaches full inner dome 10 so as to permit rotation relative to cap 2.

FIG. 4 shows an inverted cap 2 revealing the preferably loop material strips 12 at the bottom inner edge of each segment of inner dome 10. A small section of loop material 17 is also attached to the underside of brim 5. Locking strap 18 with hook material underside attaches inner dome 10 to brim 5 thereby preventing further rotation once the indicium of choice is selected.

Figure 5:
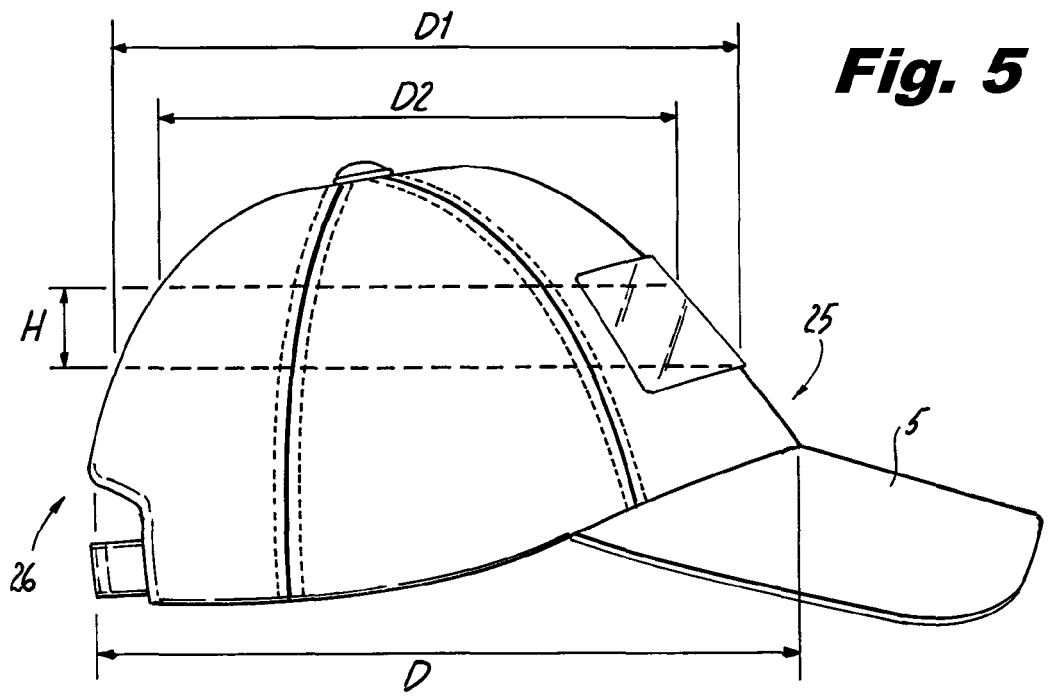
FIG. 5 is a side elevation of a baseball cap with indication of diameter dimensions relevant to the third embodiment of this invention.
Figure 6:
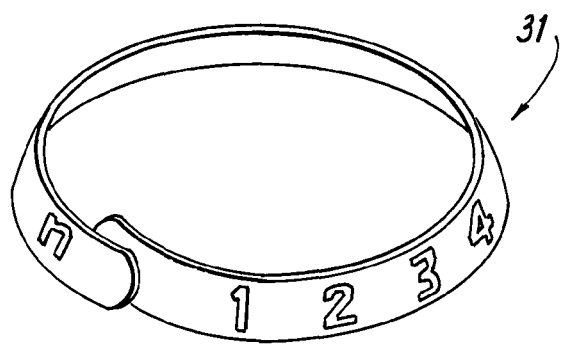
FIG. 6 is a perspective view of the split round indicia band of the third embodiment.

FIGS. 5 through 8B relate to the third embodiment of this invention using an indicia band. In FIG. 5 the region of the indicia band is shown in dashed lines. On this side view, height of the band H is shown as well as the lower inner diameter D1 and the upper diameter D2. Split round indicia band 31 is shown in FIG. 31 with indicia 1 through n on the outer surface. Note that band 31 is split with overlapping ends.

Figure 7:
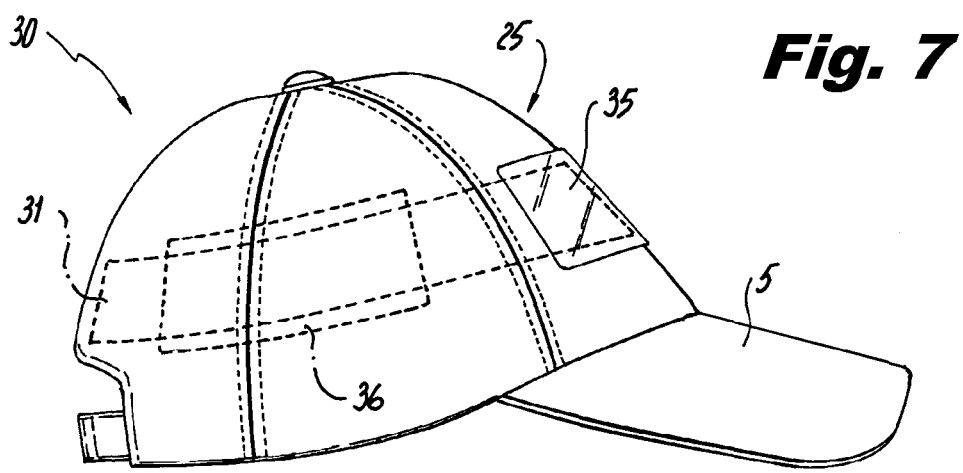
FIG. 7 is an outer view of a cap of the third embodiment.
Figure 9:
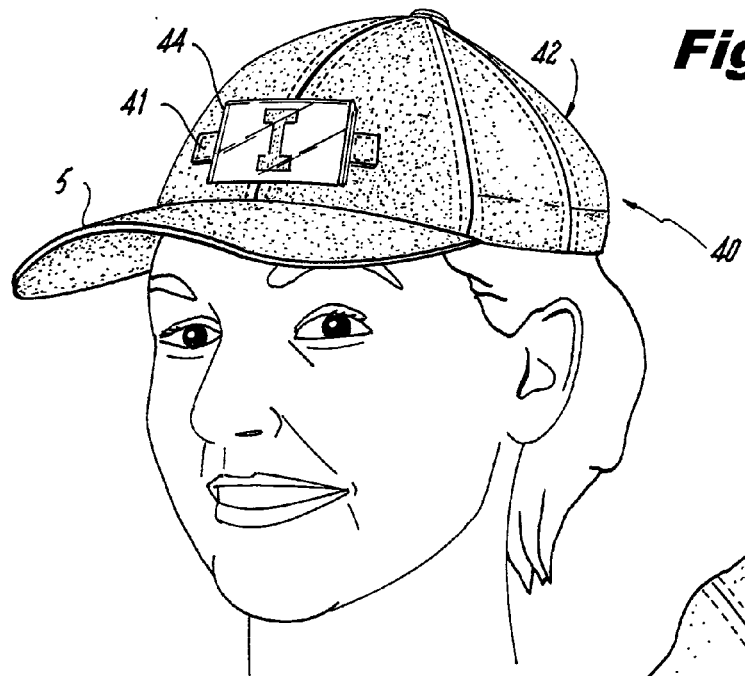
FIG. 9 is a perspective view of a baseball cap of the fourth embodiment of this invention in use with external indicia holder.

FIG. 7 shows an outer view 30 of this embodiment with modified cap 25 and the exterior of indicium window 35 which also internally guides band 31.

FIG. 8 is an underside view of embodiment 30 showing the position of band 31 above brim 5 interface and at or above back opening 26.

It is noted that band 31 is preferably supported at the sides by loose fabric sleeves 36 attached to cap dome 25. Indicium window 35 supports band 31 at the front.

The crossection details of FIGS. 8A and 8B show the spherical curve of indicia band 31. In FIG. 8A, band 31 is shown within the fabric sleeve 36. Band 31 is forced against the spherical shape of cap dome 25 by virtue of the springiness of the circular shape and its oversized diameter. Split indicia band 31 has a crossection that is curved to be conformal with the spherical interior surface of cap dome 25 at the exact elevation from the base of the cap where it is located by fabric sleeves 36. If it were flat or otherwise shaped, it would not lie against the inner cap dome surface and/or it would not naturally coil as a flat circle inside the baseball cap. Window 35, with or without a front glazing, is of rigid plastic and is fitted in an opening in cap dome 25 around its periphery in a groove. It has a curved slot on the inside to accept and guide indicia band 31 as shown in FIG. 8B. Although band 31 can be injection molded of appropriate plastic resin such as PVC, it can be formed from a flat strip passed through a heated die which will impart the proper crossectional contour as well as its round major diameter, a compound curve. The selected plastic should be of appropriate thickness and rigidity. It can also be formed of a coated, stiffened fabric or cardboard band.

The fourth embodiment 40 of this invention using an external indicia holder is represented by FIGS. 9-13. Indicia "I" is displayed in curved holder 44 in FIG. 9. The only modification of a stock baseball cap for this embodiment 40 is strap 41 shown on cap 42.

Figure 10:
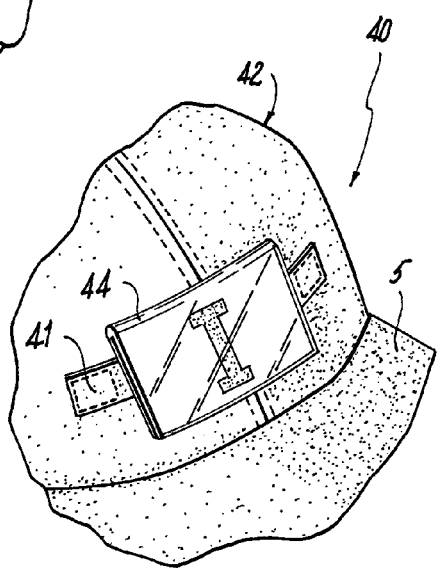
FIG. 10 is a perspective side view detail of the indicia holder on a cap.

FIG. 10 shows the detail of holder 44 clipped onto strap 41. Holder 44 has three closed sides and an open bottom slot.

Figure 11:
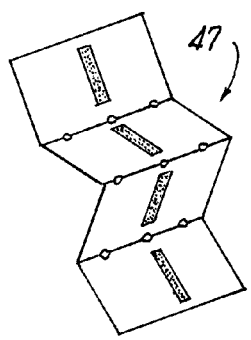
FIG. 11 is a perspective view of an indicia card pack with four folding attached cards.
Figure 12:
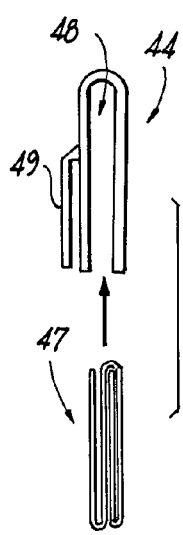
FIG. 12 is a central side crossection of the indicia holder showing the insertion of an indicia pack; and, FIG. 13 is a perspective view of a rectangular sheet curved into the shape of the surface of a cone; this is the basis of the simple curved shape of the indicia of the fourth embodiment of this invention.

FIG. 11 shows an indicia pack 47 including a plurality of cards, such as, for example, four cards, with indicia on both surfaces and attachment via perforated folds. In use, the indicium of choice is selected by folding 47 so that this is on the outer surface which will face out when inserted within recess 48 (see FIG. 12). Holder 44 is removed from cap 42 whenever a new indicium is desired to gain access to the bottom insertion slot 48; it is the re-engaged with strap 41. Integral clip 49 is attached to the back of holder 44 and engages strap 41.

Figure 13:
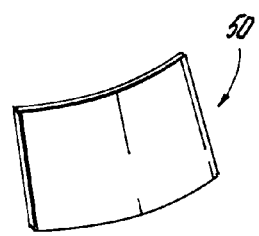

FIG. 13 shows the derivation of the shape of holder 44 from the curvature of a rectangular sheet 50 into a shallow surface of a cone. This is done to more closely approach the dome of cap 42 in shape without resorting to a compound curve that would interfere with longevity of indicia pack 47 as well smooth insertion and withdrawal from holder recess 48.

Figure 14:
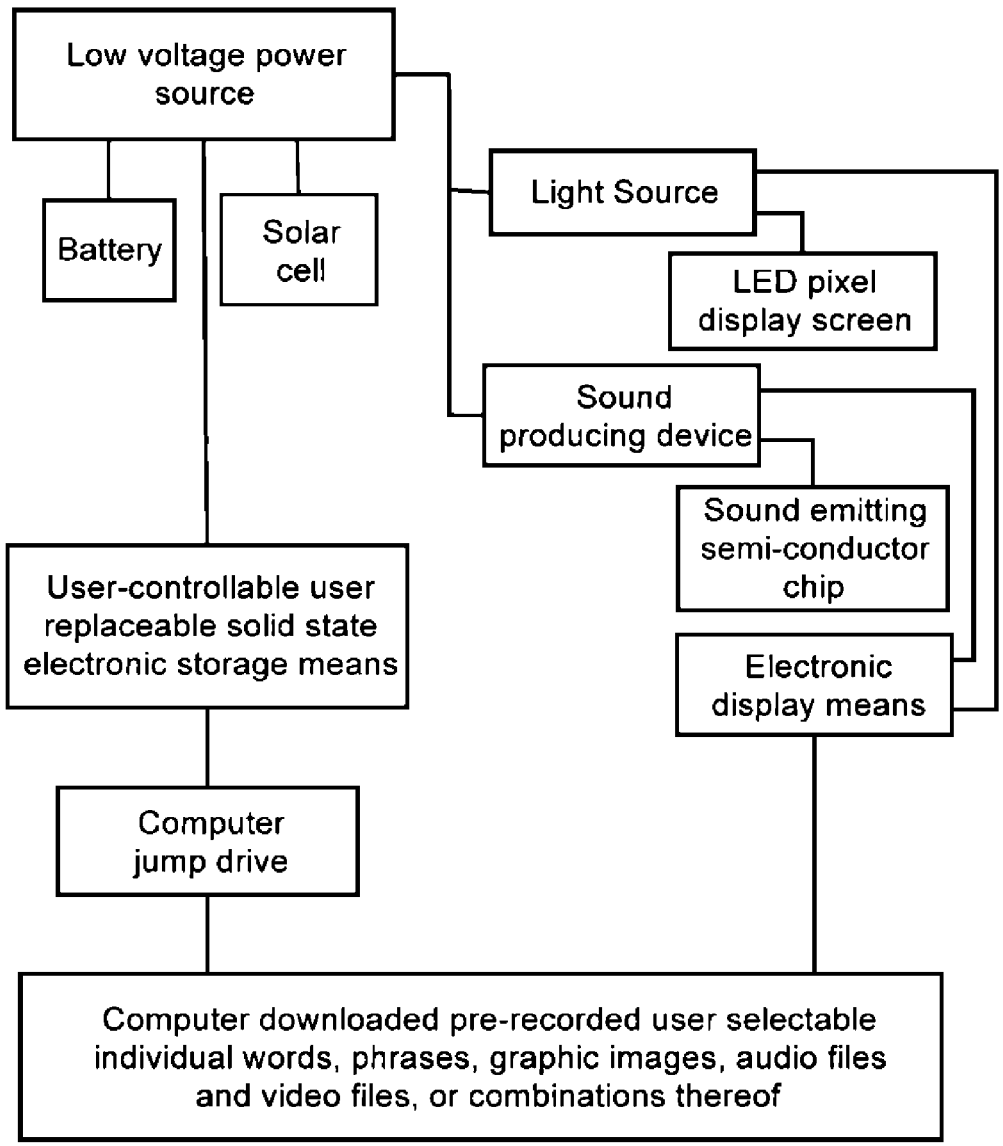
FIG. 14 is a block diagram of an alternate embodiment for electronic displays of the occupational role playing roles of the novelty apparel of the present invention.

FIG. 14 shows optionally, the display means may be an electronic display means, wherein the electronic display means includes at least one low voltage power source, such as a battery or a solar cell, and at least one electronic light source, such as an LED or LCD pixel display screen, an optional sound producing device, such as a sound emitting semi-conductor chip. In a preferred embodiment there is also provided a user-controllable user replaceable solid state electronic storage means (such as a computer jump drive) containing computer downloaded pre-recorded user selectable individual words, phrases, graphic images, audio files and video files, or combinations thereof, for user-controllable displaying on the at least one LED or LCD pixel screen to at least one other participant.

Figure 15:
FIG. 15 is a perspective view of a baseball cap of a sixth embodiment of this invention in use with at least one permanent primary indicium and at least one secondary interchangeable, removable indicium selected form a subset of alternate indicia, wherein the interchangeable, removable indicium is attached to an external indicia holder.

Alternatively, FIG. 15 shows hat with crown portion 140 having at least one indicium associated with that article of apparel which can be at least one permanently attached primary indicium 141, associated with at least one removable, interchangeable secondary indicium 142 selected from a subset of role playing phrases associated with the primary indicium. The at least one secondary indicium can be attached by any of the aforementioned removable attachment means 143, such as, for example, with VELCRO® hook and loop fasteners.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. An improvisational, novelty role-playing, entertainment game method for entertaining a plurality of players requiring competitive imaginative improvisation among at least two players of the plurality of players playing a physical real-world game, engaging in competitive, imaginative extemporaneous occupational status role-play improvisation, the method comprising:
   proposing rules and procedures, amongst the at least two players, for an entertainment session of the physical real-world game comprising said occupational status related role playing improvisation;
   negotiating, amongst the at least two players, said rules and procedures for said entertainment session;
   agreeing, amongst the at least two players, upon a set of said rules and procedures for said entertainment session;
   negotiating, amongst the at least two players, a competitive scheme for use of said set of rules and procedures;
   agreeing, amongst the at least two players, upon said competitive scheme for said entertainment session;
   donning, during said entertainment session, head gear by a first player of the at least two players which identifies said first player as virtually and imaginatively occupying a preselected occupational status related role in accordance with said set of rules and procedures agreed upon for said entertainment session; and
   engaging, during the entertainment session, in said occupational status related role playing improvisation in accordance with said set of rules and procedures agreed upon for said entertainment session,
   wherein, said head gear comprises a head covering hat having an inside surface and an outside surface for covering said first player's head, said inside surface contacting the head of the first player and said outside surface configured to display graphic indicia to a second player of the at least two players;
   wherein, said head gear comprises a user-rotatable inner liner band having said graphic indicia thereon at a plurality of locations;
   wherein, said outside surface comprises at least one front window cut-out section for displaying said graphic indicia of at least one location of the plurality of locations on said user-rotatable inner liner band, said graphic indicia being visible by said second player through said at least one front window cut-out section; and
   wherein, based on said set of agreed upon rules and procedures for the entertainment session, the first player is enabled to rotate the inner liner band to select a particular location of the plurality of locations of graphic indicia in alignment with the front window cut-out section in accordance with the set of rules and procedures agreed upon.

2. The improvisation, novelty role-playing, entertainment game method as in claim 1 wherein said inner liner band is thermoformed from a thin sheet of a semi-rigid thermoplastic.

3. The improvisation, novelty role-playing, entertainment game method as in claim 1 wherein said inner liner band is rotatable within a sweatband of said head gear covering hat to place a selected one of said graphic indicia in a selected one of said multiple locations with said front window cut-out section.

4. The improvisation, novelty role-playing, entertainment game method as in claim 1 wherein said outer surface comprises a hook-and-loop removable patch system, wherein said at least one secondary graphic indicia is selected from a plurality of patches bearing said graphic indicia which may be applied and alternately removed as desired by a player wearing said head gear by respective hook and loop members on each said patch bearing said at least one secondary graphic indicia, said patch bearing said at least one secondary graphic indicia being joinable with at least one complementary permanent patch having a hook and loop mating pad on said head gear, said at least one complementary permanent patch being located near at least one permanently attached primary graphic indicia.

5. The improvisation, novelty role-playing, entertainment game method as in claim 1 wherein said head gear further comprises an electronic display means.

6. The improvisation, novelty role-playing, entertainment game method as in claim 5 wherein said electronic display means comprises: at least one battery, at least one LED/LCD pixel display screen, at least one sound producing device, and user-controllable user replaceable solid state electronic storage means containing computer downloaded pre-recorded user selectable individual or combinations thereof of words, phrases, graphic images, audio files and video files for user-controllable displaying on said at least one LED/LCD pixel display screen.

7. The improvisation, novelty role-playing entertainment game method as in claim 6 wherein said electronic display means is mounted on a hook-and-loop fastener pad on said outside surface of said hat so as to make said electronic display means user applyable and alternately user-removable, respectively to and from said outer surface of said hat having said at least one hook-and-loop mating pad disposed thereupon.

8. A method of playing an improvisational, physical real-world role playing game amongst a plurality of participants, the method comprising the steps of:
the participants proposing, discussing and agreeing on a set of rules and procedures for an entertainment session of the physical real-world role playing game comprising occupational status role playing gameplay;
the participants negotiating and agreeing upon a competitive scheme for use of said set of rules and procedures;
providing head gear apparel for each participant, wherein each head gear apparel comprising (i) a head covering crown having a front window cut-out section, and (ii) a user-rotatable inner liner band contacting the head of the participant, positioned under said head covering crown, having graphic indicia thereon at a plurality of locations, the graphic indicia made up of a series of role playing status identifiers, each status identifier capable of being displayed through said front window cut-out section by rotating said inner liner band to one of the plurality of positions aligning a selected graphic indicia with the front window cut-out section;
each participant selecting a role playing status identifier from the series of role playing status identifiers in accordance with the set of rules and procedures agreed upon for display through the front window cut-out section of each head gear apparel;
rotating said inner liner band to a location of the graphic indicia for the selected role playing status identifier; and
the participants engaging in said occupational status role playing gameplay in accordance with agreed upon set rules and procedures and agreed upon competitive scheme with said head gear apparel.

9. The method as in claim 8, wherein said inner liner band is split with overlapping ends.

* * * * *